United States Patent [19]

Piper

[11] Patent Number: 5,760,787
[45] Date of Patent: Jun. 2, 1998

[54] DATA STORAGE FORMAT

[75] Inventor: Anthony David Piper, Mosman, Australia

[73] Assignees: Canon Information Systems Research Australia, PTY Ltd., Australia; Canon Kabushiki Kaisha, Japan

[21] Appl. No.: 516,071

[22] Filed: Aug. 17, 1995

[30] Foreign Application Priority Data

Sep. 16, 1994 [AU] Australia ............... PM 8224

[51] Int. Cl.⁶ .......................................... G06F 15/00
[52] U.S. Cl. .......................................... 345/442
[58] Field of Search .................... 395/141, 142; 345/131, 132, 134, 440, 441, 442, 443

[56] References Cited

U.S. PATENT DOCUMENTS

5,568,601  10/1996  Yamauchi et al. ............... 395/142

*Primary Examiner*—Phu K. Nguyen
*Attorney, Agent, or Firm*—Fitzpatrick, Cella, Harper & Scinto

[57] ABSTRACT

A method and apparatus for storing data defining a graphical outline of an object, the graphical outline comprising a series of curve segments. First, those curve segments which comprise straight line segments are determined. The method next stores a first number of associated control points for each of said curve segments which do not comprise straight line segments. The method then operates to store a reduced number of associated control points for each of the curve segments which comprise straight line segments.

10 Claims, 5 Drawing Sheets

Relative Value Storage Format

| XXXXXXX 0 |

Absolute Value Storage Format

| XXXXXXX 1 | XXXXXXXX |

DATA STORAGE FORMAT

FIELD OF THE INVENTION

The present invention relates to data storage format for computer graphic objects and more particularly discloses an efficient method of storing edges of computer graphic objects.

BACKGROUND ART

In modern computer graphic imaging systems, the images to be created are often stored within the computer system by means of storing their outline and associated internal colour information. For example, the character "A" which is to be rendered on a display or printing device is normally stored in a device independent format by storing the outline of the device, which often comprises a series of splines to define the border of the character and a representation of its internal colour. Other more arbitrary objects, having a different border structure, can also be stored by means of storing an outline in the form of splines.

Where there is a large number of images, with a large proportion of each image to be stored in a spline outline format, there is a general need for an efficient and effective way of storing splines so as to minimise the amount of space taken up by their storage while simultaneously allowing for rapid access to the spline data format.

SUMMARY OF THE INVENTION

It is an object of the present invention to provide an effective storage format for graphical objects made up of splines or the like.

In accordance with one aspect of the present invention there is provided a method for storing data defining a graphical outline of an object, said graphical outline comprising a series of curve segments, said method comprising the steps of:

determining those curve segments which comprise straight line segments;

storing a first number of associated control points for each of said curve segments which do not comprise straight line segments; and storing a reduced number of associated control points for each of said curve segments which comprise straight line segments.

BRIEF DESCRIPTION OF THE DRAWINGS

The preferred embodiment of the present invention will now be described in relation to the accompanying drawings in which.

DETAILED DESCRIPTION

Figure 1:
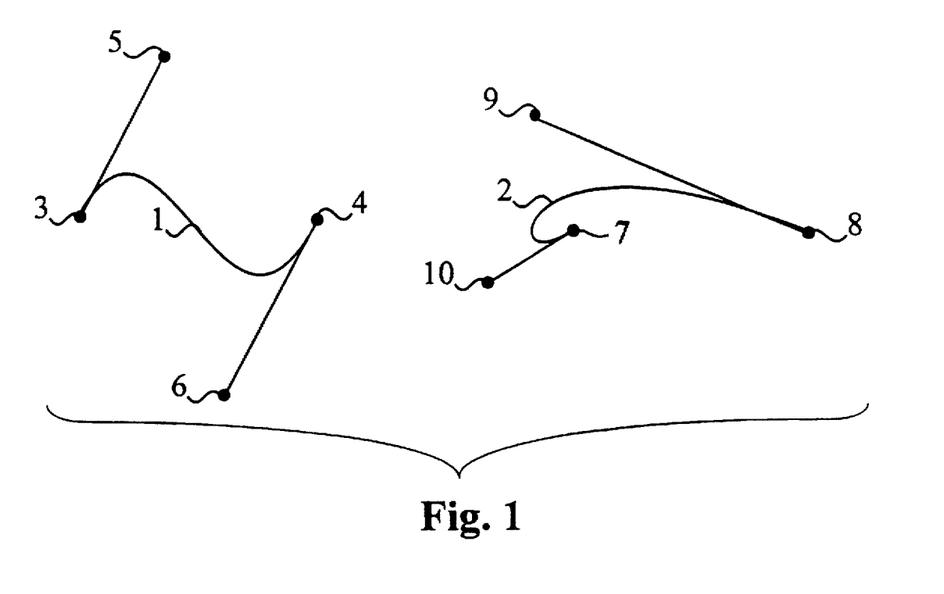
FIG. 1 illustrates two splines and their associated control points.

The preferred embodiment of the present invention will be described in relation to the storage of splines which, as noted previously, is the traditional form for storing graphic outlines. A cubic Bézier spline is normally defined by means of four data or control points, which consist of the two end points of the spline and two tangential control points. For example, FIG. 1 shows two splines 1 and 2. The first spline 1 has end points 3 and 4 and tangential control points 5 and 6. Similarly, the second spline 2 has end points 7 and 8 and tangential control points 9 and 10. For further information on the nature and variations on the spline format, reference is made to a standard text such as "Computer Graphics, Principles and Practice" by Foley et al, published 1990 by the Addison Wesley Publishing Company, Reading, Mass. and more particularly Chapter 11 thereof.

Figure 2:
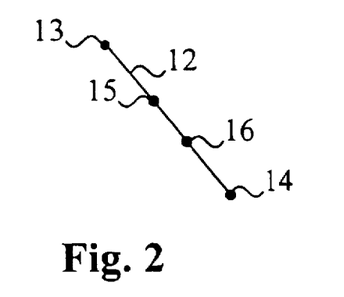
FIG. 2 illustrates the straight line form of a spline.

It is has been found, as a result of statistical studies conducted by the present applicant, that the nature of splines stored in a computer graphics system normally take on certain characteristics. For example, there is normally a large number of splines that are equivalent to straight line segments where the control points lie on part of the line. For example, referring now to FIG. 2, there is shown a spline 12 having end points 13 and 14 and tangential control points 15 and 16. It can be seen, that the spline 12 has degenerated to a straight line segment in which the control point s15 and 16 lie on the spline 12.

Other characteristics include the fact that each spline is normally connected to another spline which is further connected to other splines so as to build up the border of various objects.

Figure 3:
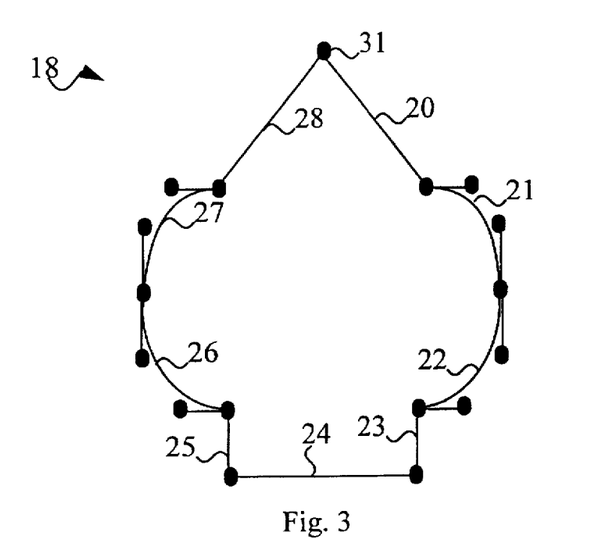
FIG. 3 illustrates a graphical object.

Referring now to FIG. 3, there is shown an object 18 made up of a series of splines 20–28. The splines 20, 23, 24, 25 and 28 have degenerated to straight line segments and, as such their tangential control points need not be stored, thereby evidencing a substantial saving in storage space. The outline of the object 18 can then be stored in a "Straight Line Aware" (SLA) data structure or block of storage which maximises the stored information content. The object 18 of FIG. 3 could then be stored in a data structure 30 of FIG. 4. This data structure comprises a Start X and Start Y value which indicate an anchor point, say 31, on the object 18 which is a starting point for the object. This is followed by an indicator, denoted Num Curves which indicates the number of curves or splines to follow, which in the case of the object 18 of FIG. 3, is equal to 9. Subsequently, a series of SLA blocks 32 are stored within the data structure 30 with each SLA blocks 32 storing a series of splines. The number of curves or splines stored within each SLA block 32 is normally four, with the last SLA 32 block only storing the remainder number of curves.

Figures 4, 5:
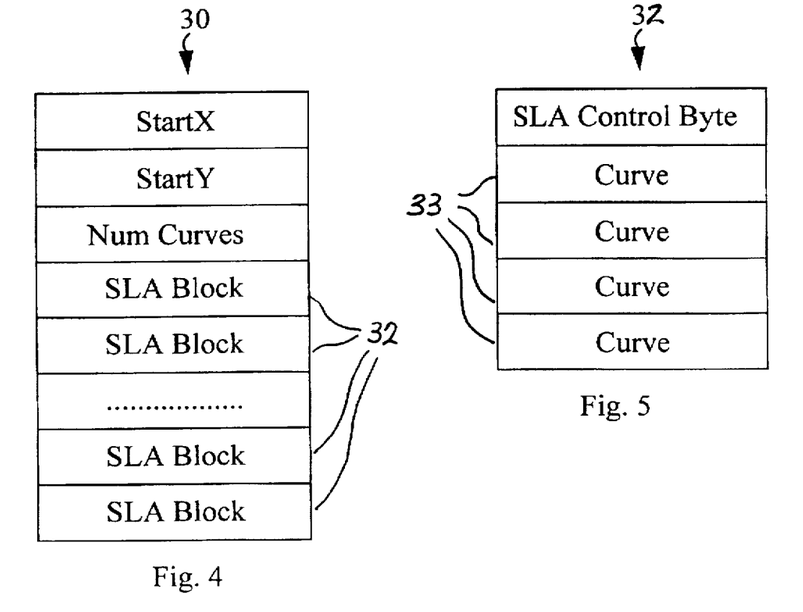
FIG. 4 illustrates the data structure utilised to store a graphical object.
FIG. 5 illustrates a "Straight Line Aware" block.

Referring now to FIG. 5, there is shown a single SLA block 32 which comprises an SLA control byte and a series of data 33 relating to four curves. The SLA control byte consists of 1 byte (8 bits) of information, with each successive 2 bits referring to subsequent curves following the SLA control byte. The 2 bit indicator of the curved type is in accordance with Table 1 below:

TABLE 1

| Indicator | Description |
| --- | --- |
| 00 | Diagonal line, curve contains two values; x and y |
| 01 | Horizontal line, curve contains one value for x only |
| 10 | Vertical line, curve contains one value for y only |
| 11 | General spline, curve contains three (x,y) value pairs |

With reference to the object 18 of FIG. 3, the first SLA block data structure 30 will therefore store the first four curves 20 to 23. The second SLA block data structure 30 can store the next four curves 24 to 27 of object 18, with a final SLA block storing the diagonal line 28.

Figure 6:
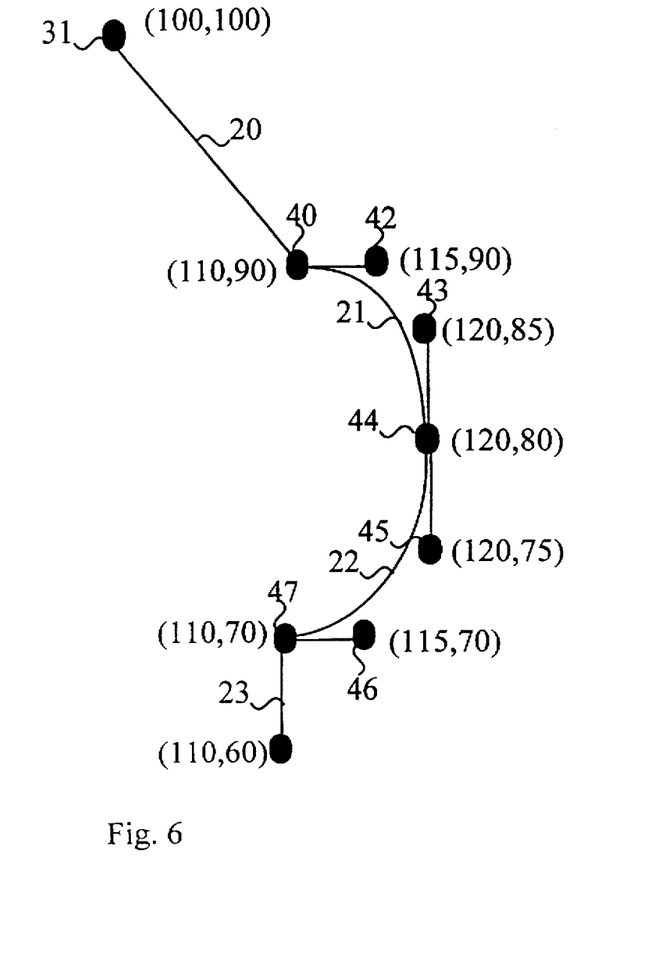
FIG. 6 illustrates a portion of the object of FIG. 3 in more detail.
Figure 7:
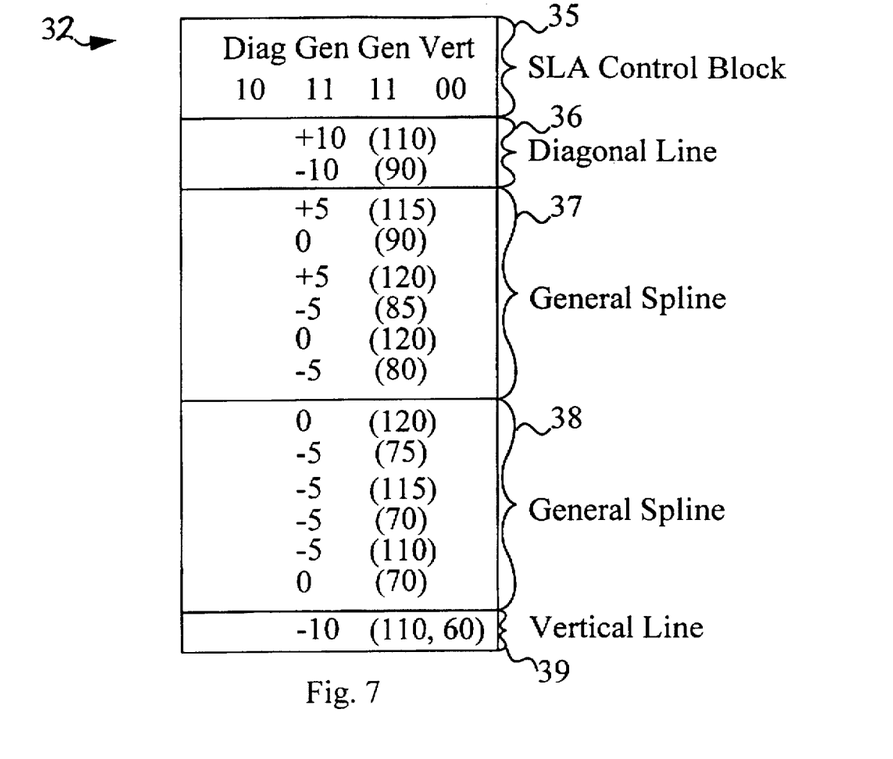
FIG. 7 illustrates the data structure for storing the fragment of FIG. 6.

Referring now to FIGS. 6 and 7, there is shown in FIG. 6, the portion of the object 18 of FIG. 3 which is stored in the first SLA block 32 of the data structure 30 of FIG. 4 and there is shown in FIG. 7 the corresponding first SLA block 32. The SLA block 32 includes an SLA control block 35 which stores a bit pattern corresponding to the following diagonal line, general spline, general spline and vertical line, curves which make up the curved data of the SLA block 32. The next area of storage 36 corresponds to the diagonal line 20 (FIG. 6). For the diagonal line 20, it is only necessary to store its end point 40 (FIG. 6) as the anchor value 31 of the line 20 will be stored as the Start X and Start Y values within data structure 30 of FIG. 4.

Figure 8:
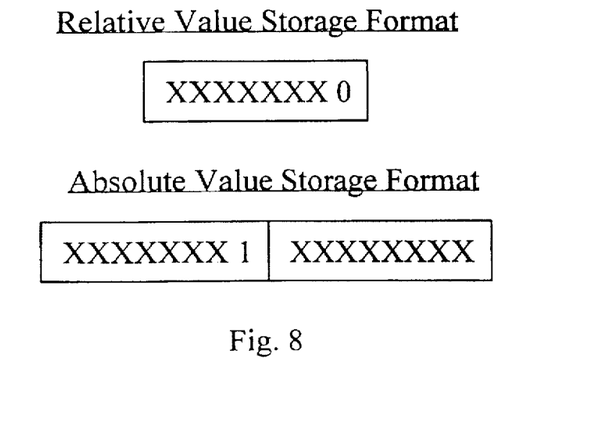
FIG. 8 illustrates relative and absolute value storage formats utilised for storing data points with the preferred embodiment.

Statistical examination of typical objects stored within the computer graphics systems and utilised for imaging, conducted by the present applicant, also show that many splines are of only a short length, often less than 32 pixels long when printed out on an A3 page. Therefore, advantages can be obtained by storing relative co-ordinates rather than absolute co-ordinates of the various control points. The two values stored to represent the diagonal line, being +10 and −10, which represent the point 40. The particular storage format is the relative value storage format as represented in FIG. 8 which comprises 7 bits of data and a least significant bit which is set to zero to indicate that the byte of storage is in a relative value storage format. As the data portion of the relative storage format is 7 bits long, values in the range of −64 to +63 can be stored in the relative storage format. If the value required to be stored is outside this range, then the value can be stored in an absolute value storage format which is also shown in FIG. 8, which is a 2 byte storage format with the first byte having the value 1 in its least significant bit. The absolute value storage format is therefore 15 bits altogether, having values which can range from 0 to 32,767 which is sufficient for most output devices.

After the portion 36 devoted to the diagonal line 20, the general spline 21 (FIG. 6) is stored by storing the control points 42 to 44 in a storage area 37 (FIG. 7). After the general spline 21, the general spline 22 is stored by storing the control points 45 to 47 in a storage area 38 (FIG. 7). Finally, the vertical line segment 23 (FIG. 6) is stored in storage area 39 (FIG. 7) by storing only the change in y value, as it is known that the line is vertical by means of SLA control block 35. The rest of the curves of the object 18 of FIG. 3 are stored in subsequent SLA blocks thereby encoding the whole of the outline of the object 18.

Figure 9:
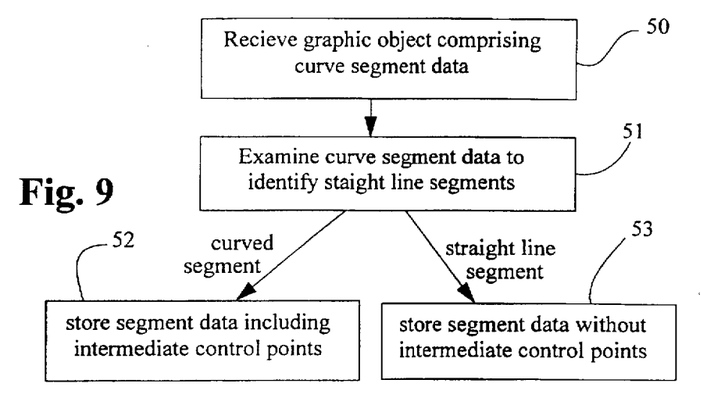
FIG. 9 depicts a flow diagram representation of a broad aspect of the present invention.

As shown in FIG. 9, a method for storing data in the manner described above fundamentally requires a first step 50 of receiving, which in some instance can comprise generating, a graphical outline of an object, composed of data defining a series of curve segments. Next, a step 51 is performed which entails determining from a the data those curve segments which comprise straight line segments. As such the data can be placed into one of two groups depending on the result of the determination. With one group, a step 52 is performed which involves storing a first number of associated control points for each of the curve segments which do not define straight line segments. This typically involves storing the endpoints and all intermediate control points of the curve segment. With the other group, a step 53 is performed which involves storing a reduced number of associated control points for each of the curve segments which define straight line segments. Typically, this involves storing only the endpoints of the curve segment.

Figure 10:
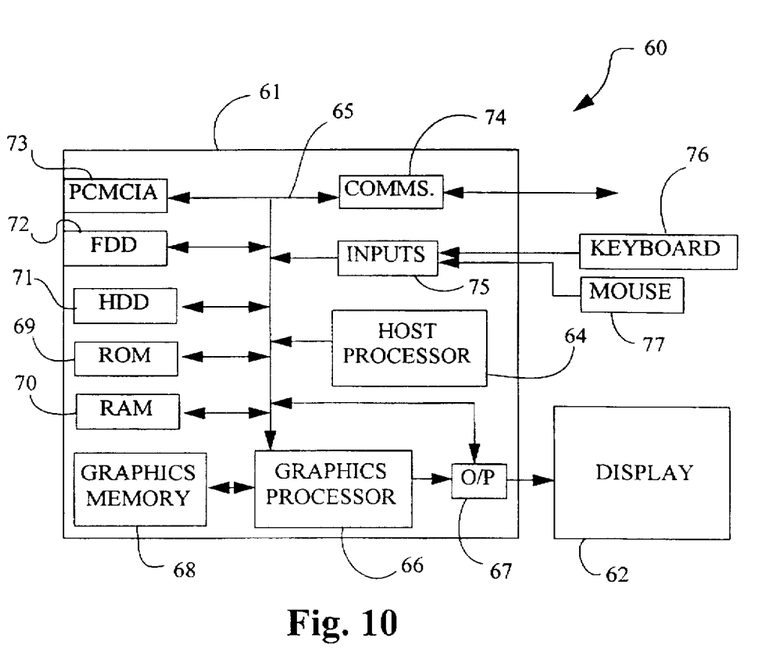
FIG. 10 is a schematic block diagram representation of a system configured for operation in accordance with the preferred embodiment.

FIG. 10 schematically illustrates a system 60 configured to perform the preferred method described above. The system includes a computer device 61 generally linked to a display 62 which is typically a video display unit or a printer for example. The device 61 includes a host processor 64 linked by a system bus 65 to other components of the device 61.

The host processor is configured using controlling programs retained in a read-only-memory (ROM) 69 and/or a hard disc drive (HDD) 71 to perform operations for either generating or manipulating graphic objects for generation of image for reproduction on the display. Typically, the host processor 64 is linked to the display via a graphics processor which is specifically configured to perform graphical operations upon display lists of graphic objects generated by the host processor 64. In some instances, the graphics processor 66 can be connected to a dedicated graphics memory 68 for the temporary storage of object-based or pixel-based imaged data, depending on the specific application. Further, an output unit 67 can be provided to buffer data between the device 61 and the display 62. In some applications the unit 67 can be used to provide a color fill to graphic objects being rendered.

To operate in accordance with the preferred embodiment, the host processor 64 can receive graphic objects from a variety of sources such as the HDD 71, the ROM 69, a floppy disc drive 71, a PCMCIA memory card socket 73, from a communications network via a communications module 74, or from user generated sources such as a keyboard 76 or a mouse 77 which are interface via an input module 75 to the bus 65. Once received, a program arrange in accordance with the preferred embodiment is run by the host processor to classify each of the curve segments of each graphic object. For those straight line objects, control points can be discarded and the objects then stored in the format described above, typically in a semiconductor random access memory (RAM) 70 or the HDD 71, for example. The host processor 64 can then prepare display lists of objects for passing to the graphics processor 66 for rendering and display, as a result of utilizing the preferred embodiment, the useful capacity of the RAM 70 or HDD 71 is effectively increased by reducing the amount of raw data required to be stored therein.

It has been found in practice that the above storage format results in substantial savings for the storage of outline based objects thereby allowing substantially more objects to be stored within a given storage space.

The foregoing describes only one embodiment of the present invention and modifications, obvious to those skilled in the art, can be made thereto without departing from the scope of the invention.

I claim:

1. A method for storing data defining a graphical outline of an object, the graphical outline comprising a series of curve segments, said method comprising the steps of:

determining which of the curve segments comprise straight line segments and which of the curve segments do not comprise straight line segments;

storing a first number of associated control points for each of the curve segments which do not comprise straight line segments; and where a second number of associated control points exist for each of the curve segments which comprise straight line segments, storing a third number of associated control points for each of the curve segments which comprise straight line segments, the second number being less than or equal to the first number and the third number being smaller than the second number.

2. A method for storing data as claimed in claim 1, wherein each said curve segment comprises a spline having data describing four control points and said third number of associated control points is two.

3. A method for storing data as claimed in claim 1, wherein for each said object, each said curve segment connects to at least one other of said curve segments at each of its ends, wherein said curve segments comprise splines having four control points and said first number of associated control points is three and said third number of associated control points is one.

4. A method for storing data as claimed in claim 1, wherein said control points are stored in a relative format.

5. A method for storing data as claimed in claim 1, wherein said control points form a series of values and those members of said series, which are less then a predetermined distance from previous members of said series, are stored in a first relative storage format, and members of said series which are greater than said predetermined distance from a previous member of said series are stored in a second absolute storage format.

6. A method for storing data as claimed in claim 1, said method further comprising the step of storing said curve segments in a series of blocks, each said block having an associated therewith a header indicating the type of curves stored within said block.

7. A method for storing data as claimed in claim 6, wherein said blocks have separate storage formats for diagonal lines, vertical lines, horizontal lines and general splines respectively.

8. Apparatus for storing data defining a graphical outline of an object, the graphical outline comprising a series of curve segments, said apparatus comprising:

first means for receiving the data defining the segments;

second means for determining from the data which of the curve segments comprise straight line segments and which of the curve segments do not comprise straight line segments;

third means for storing the data describing a first number of associated control points for each of the curve segments which comprise straight line segments; and where for each of the curve segments that comprise straight line segments that are described by a second number of associated control points, the second number being less than or equal to the first number, fourth means for storing the data describing a third number of associated control points for each of the curve segments which comprise straight line segments, the third number being smaller than the second number.

9. Apparatus as claimed in claim 8 wherein said fourth means acts to discard tangential control points of said straight line segments.

10. Apparatus as claimed in claim 9 wherein said apparatus comprises a host processor of a computer graphics device.

* * * * *

UNITED STATES PATENT AND TRADEMARK OFFICE
CERTIFICATE OF CORRECTION

PATENT NO. : 5,760,787

DATED : June 2, 1998

INVENTOR(S): ANTHONY DAVID PIPER

Page 1 of 2

It is certified that error appears in the above-identified patent and that said Letters Patent is hereby corrected as shown below:

ON THE COVER PAGE AT [73], ASSIGNEES

"Australia;" should read --Mosman, Australia;--; and "Japan" should read --Tokyo, Japan--.

ON COVER PAGE AT [57] ABSTRACT

Line 6, "said" should read --the--.

COLUMN 2

Line 24, "is" should be deleted;
Line 33, "point s/15" should read --points 15--;
Line 56, "blocks" should read --block--;
Line 58, "32 block" should read --block 32.

COLUMN 3

Line 67, "a" should be deleted.

COLUMN 4

Line 42, "arrange" should read --arranged--;
Line 51, "as a" should read --As a--.

UNITED STATES PATENT AND TRADEMARK OFFICE
CERTIFICATE OF CORRECTION

PATENT NO. :   5,760,787

DATED        :   June 2, 1998

INVENTOR(S):   ANTHONY DAVID PIPER

It is certified that error appears in the above-identified patent and that said Letters Patent is hereby corrected as shown below:

COLUMN 5

Line 29, "then" should read --than--.

COLUMN 6

Line 1, "an" should be deleted.

Signed and Sealed this

Sixteenth Day of March, 1999

Attest:

Attesting Officer

Q. TODD DICKINSON

Acting Commissioner of Patents and Trademarks